Nov. 22, 1966    J. J. MAUGET    3,286,401
PLANT INJECTION DEVICE
Filed March 10, 1964
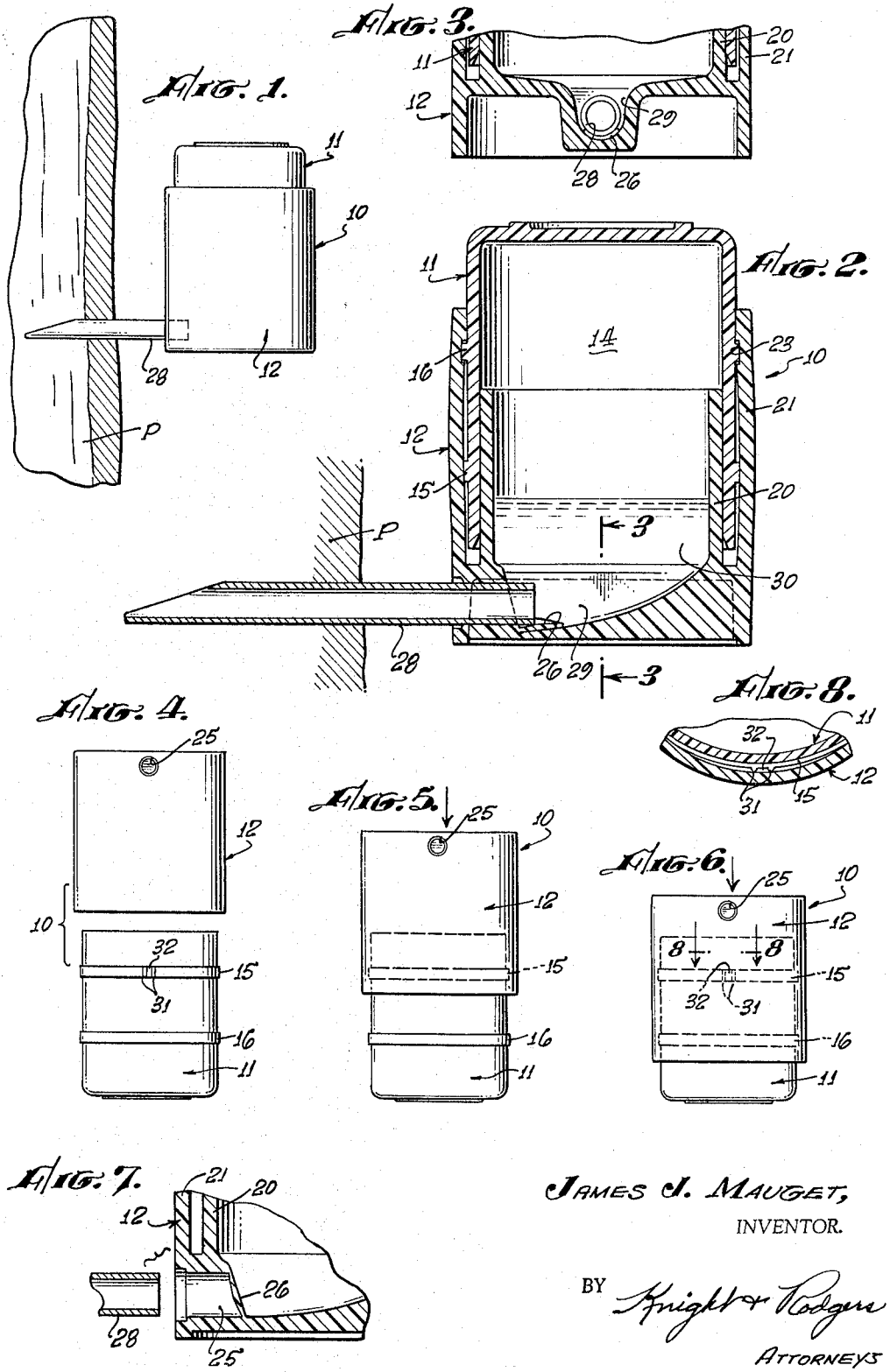
JAMES J. MAUGET,
INVENTOR.
BY *Knight & Rodgers*
ATTORNEYS United States Patent Office 3,286,401
Patented Nov. 22, 1966

3,286,401
PLANT INJECTION DEVICE
James J. Mauget, 1043 Bilton Way, San Gabriel, Calif.
Filed Mar. 10, 1964, Ser. No. 350,751
12 Claims. (Cl. 47—57.5)

The present invention relates generally to apparatus for injecting plants with liquids, and more especially to apparatus providing for safe handling of toxic liquids in economical disposable containers within which a slight super-atmospheric pressure can be developed by the user for forcing the liquid contents out of the container and into a plant for treatment thereof by injection methods.

Injection of a plant is carried out by inserting a feeder tube into the stem of the plant deeply enough that the open inner end of the tube is inwardly of the cortex layer of the trunk. The equipment may be compared to a hypodermic needle used on humans, and the injection method is similar to intravenous injection or feeding since the result is the injection of the desired liquid directly into the sap stream of the plant.

Injection of plants, while not new, has not been widely understood or practiced because the full possibilities of treatment of plants by this method have not been readily apparent for various reasons, one of which is the fact that chemicals which can be administered in this manner have only recently been developed. With a continually increasing number of compounds which are suitable for injection treatment, the potential results of such treatment are indeed great and are becoming of greater economic importance. For example, one aspect that has already been widely developed is feeding small quantities of nutrient solutions to plants in order to remedy deficiencies in the nutrients naturally available to the plant from the surrounding soil.

Recent developments in the field of chemistry have made available new compounds which are of great potential importance in the field of injection treatment of plants. This newer aspect of plant treatment is the administration of liquids which effect growth control, prevention of diseases, and elimination of insects which feed upon the leaves or upon the woody structure of the plants. Such treatments are generally referred to as chemotherapy. Insects, as well as virus and fungus infections, can now be controlled in many situations by the use of antibiotics and/or systemic insecticides administered by injection methods. Research has shown that newly developed insecticides now available are very effective in controlling, combating, and often entirely eliminating various insect pests which formerly threatened great damage to plants. In this manner the spread of many diseases can be controlled. Chemotherapeutic methods often achieve results that are very difficult, if not impossible, to achieve by conventional methods of treating plants.

Injection has many advantages over older and more widely used methods of externally applying insecticides, as by spraying or dusting plants. Injection eliminates the airborne rust or dust that carries away much of the active agent and creates a hazard to animal life. All the insecticide administered by injection is used effectively. Also, there is no active residue on the plants to create a hazard to wildlife. The phosphate base compounds deteriorate rapidly after the leaves fall and soon become entirely harmless.

Liquids have in the past been administered to plants by gravity-type reservoirs attached to feeder tubes. While these feeders are entirely satisfactory for many situations, especially for administering nutrients, they are unsuitable for handling toxic materials. This unsuitability arises chiefly because the gravity feeders are not hermetically sealed, being necessarily vented to the atmosphere, and are not, therefore, suitable for handling potent modern systemic insecticides which are toxic to humans and which should, for safety reasons, be shipped, sold, and otherwise handled only in completely sealed containers. Presently-known insecticides, for example phosphate base insecticides, are so extremely effective that they can be administered in very small quantities, for example in doses of only one to seven millilitres. These materials are of such high toxicity to humans and warm blooded animals that official regulations make their sale and use in unsealed containers limited to properly licensed personnel; and even then their use is surrounded by such restrictions as to be difficult and expensive.

One of the disadvantages of a gravity-type reservoir has been overcome by providing a hermetically sealed container holding a small quantity of gas under pressure which provides a convenient means for quickly driving the liquid contents of the container out into a tree or other plant. Gaseous propellants have generally been placed in metal containers because they can be made completely gas-tight and the metal wall is itself impervious to gas. However, such containers are relatively expensive, especially when the containers are not reused and when they are designed to hold only a very small dose. Containers of synthetic resin or plastic offer the advantages of low cost, light weight, and safe, easy disposability by burning after use so that they are economically advantageous for single-use containers. The problem with such materials is that most of them are slightly permeable to gases and so the internal gas pressure is usually lost after a few weeks, or at the most, months. This severely limits the length of time a charged plastic container can be stored and greatly lessens the utility of a plastic container made of such materials and holding a charge of gas at a pressure above atmospheric. A long "shelf life" is much to be desired to assure that the retailer or user always has on hand usable merchandise and does not suffer unnecessary losses from containers that no longer have sufficient gas pressure to force out the liquid contents.

Thus, it becomes a general object of the present invention to provide means for safe handling and injection into plants of liquids that are highly toxic to humans and thus to make available to the public at large such materials by eliminating the hazards involved with their use.

It is also an object of the present invention to provide an improved type of container suitable for positive injection of liquids into plants in which gas pressure can be developed by the user at the time of use in a simple and effective manner, thus eliminating the need for packaging a propelling charge and the problem of loss of the gas charge through a permeable wall while the container is in storage.

A further object of the invention is to provide a simple, inexpensive container in which toxic liquids can be hermetically sealed and one which permits the contents to be injected directly into a plant without danger of exposure thereto by the person using the container, the liquid within the container being quickly and completely discharged.

These objects of the present invention have been achieved by providing a hollow container comprising a pair of cup-like, interfitting, relatively movable container sections which cooperate to define an interior space adapted to receive a liquid to be administered to plants. The container sections carry locking means which is operative at each of two spaced positions to resist relative motion of the sections in a direction to separate the sections but disengageable at least one position to permit relative motion of the sections in a direction to reduce the volume of said space. Such reduction in the volume of the interior space reduces the proportion of the interior space which is occupied by the gas (normally air) above and in contact with the liquid, thus raising the pressure of the gas to a super-atmospheric value which can drive the liquid out of the container. The container is provided with a discharge passage opening at one end to the exterior of the container and initially closed by means which can be broken or removed by insertion of the feeder tube into the passage from outside the container. The contents are then discharged through the feeder tube into the plant under the gas drive afforded by the gas within the container at a pressure above atmospheric.

How the above objects and advantages of the present invention, as well as others not specifically referred to herein, are attained will be more easily understood by reference to the following description and to the drawing, in which:

FIG. 1 is a side elevation of a completely assembled device with a feeder tube inserted in the container and in the trunk of a tree or the like for injecting the fluid from the container into the tree.

FIG. 2 is an enlarged vertical median section through the container and the feeder tube.

FIG. 3 is a fragmentary median section on the line 3—3 of FIG. 2.

FIGS. 4, 5 and 6 are side elevations of the container showing respectively the container as the sections are being assembled, when filled ready for sale and storage, and in the compressed position of final use.

FIG. 7 is a fragmentary section similar to FIG. 2 showing the discharge passage and the destructible closure means at the inner end thereof.

FIG. 8 is an enlarged fragmentary section on line 8—8 of FIG. 7.

Referring now to the drawing, there is shown in FIG. 1 an injection device constructed according to the present invention which comprises a two-part container indicated generally at 10. The container body is made in two telescoping sections 11 and 12 which slidably interfit with each other, as will be more fully explained, and which cooperate to enclose an interior space 14 of variable volume within which the contents are placed. Both container sections 11 and 12 are generally tubular, preferably being externally of cylindrical shape for practical reasons. Each of the sections is open at one end and closed at the other, the open end of each section being closed by the other section when assembled. Thus, it will be apparent that each of the sections may be described as being generally cup-shaped; and each section serves as a closure means to close the open side of the other section.

As may be seen from FIGS. 2 and 4, container section 11, sometimes referred to as the vial, has a single annular wall on the outside of which are two spaced annular ridges 15 and 16. Both ridges 15 and 16 have at least one angular corner forming an outwardly facing radial shoulder, since they are part of locking means carried cooperatively by the two sections 11 and 12, as will become more fully apparent. Ridges 15 and 16 are shown as rectangular in shape but they are not necessarily limited thereto.

Container section 12, sometimes referred to as the cap, is for much of its length a double-walled member since it is provided with inner and outer annular walls 20 and 21 respectively, which are spaced apart in order to receive between them the wall of section 11. Inner wall 20 is smooth on both the inner and outer surfaces, while outer wall 21 is provided with an annular groove 23 near the outer end of the inner face of the wall. Groove 23 is of a size and shape to receive either of the ridges 15 and 16 and to provide a generally radial shoulder on the cap section facing inwardly. Engagement of the groove wall with one of the ridges as at 18 holds the two container sections against relative movement in direction tending to separate them. Thus, the two axially spaced ridges 15 and 16 and groove 23 provide oppositely facing shoulders that serve as cooperating elements of locking means which is engageable at either one of two relative positions of the two container sections to restrain the sections against axial movement in one direction.

The configuration of the ridges and the cooperating groove 23 is such that when ridge 15 is located in groove 23, as in FIG. 5, the ridge can be disengaged from the groove to permit movement of section 11 inwardly relative to section 12 in order to move the two sections to a second position shown in FIGS. 2 and 6 at which ridge 16 enters groove 23.

In order to facilitate disengagement of locking ring 15 from groove 23, the inner edge of the groove may be bevelled or otherwise shaped to allow ring 15 to disengage from the groove under sufficient axial pressure and let the cap move inwardly of body section 11. Alternatively, one edge of locking ring 15 may be formed in such a manner as to facilitate such disengagement. It will be understood that there is sufficient flexibility in the outer wall 21 of the cap section to allow the wall to expand over locking ring 15 as it is moved inwardly to the position shown in FIG. 2.

Cap section 12 is preferably made of a low or medium density polyethylene, or other material having similar characteristics, in order that the cap section may be slightly elastic, permitting the cap to expand as it moves over ridge 15, as just described. However, the vial section 11 is preferably made of a high density polyethylene which is considerably more rigid. This enables the body section to resist substantial deformation and retain its shape during assembly. Also, the high density polyethylene is much less permeable to gases for a given wall thickness and therefore is more effective in reducing loss of any gaseous contents through the single, relatively thinner wall of section 11.

One of the two sections of the container, but preferably cap 12, is provided with a fluid discharge passage 25 which communicates at one end with the exterior of the container. At a position spaced inwardly from the outer end, passage 25 is closed from communication with the inner space 14 by suitable closure means that can be removed. A wall or membrane 26, shown particularly in FIG. 7, is preferred as it can be molded in place and eliminates leakage at this point. The axis of fluid passage 25 is preferably substantially at right angles to the central axis of the container, since this is an advantageous position when the container is mounted on the stem of a plant, as will become apparent. The destructible or removable wall 26 is preferably integral with the body of section 12 and is disposed in a plane inclined to the axis of discharge passage 25. This is done in order to facilitate rupture of the wall.

When it is desired to use the container, the wall is ruptured by inserting feeder tube 28 in discharge passage 25 and pressing the tube inwardly until it comes in contact with the wall 26. Because the wall is inclined with respect to the axis of the tube, the squared end of the tube comes initially into point contact with the wall. Hence, the entire inward force of the tube applied to the wall is highly concentrated at such point of initial contact. This makes rupture of the wall much easier than if contact were around the full circumference of wall 26. An advantage is that a thicker wall 26 can be used which in turn reduces permeation losses and increases the safety factor.

Passage 25 leads into sump 29 in the end wall of cap 12 which is at the bottom of the container when in the discharge position of FIG. 2. The end wall of the cap slopes toward the sump; and the sump is deepest at the end entered by tube 28, thus minimizing the amount of liquid that can be retained in the container and not normally discharged.

Discharge passage 25 is preferably made circular in cross section in order to conform to the exterior shape of the end of feeder tube 28. The sizes of the tube and of the passageway are such that frictional engagement between the tube and container permits the container to be supported securely on the end of the tube inserted in the passageway. A close fit prevents the tube from easily being pulled out of the passage and also prevents any leakage or loss of contents from the container. This is particularly important when the contents are of a toxic nature and contact with the liquid is to be avoided by persons handling the injection device.

Feeder tube 28 is fixed in the plant stem and does not turn. This allows the container to be turned on the tube; and this can be done without breaking the seal between the tube and container. Rotation of the container 180 degrees about the tube brings the other end down; and the container can be checked visually to see if it is empty since the translucent nature of the vial 11 permits liquid inside to be detected.

When filling the device, a small amount of liquid such as indicated at 30 is placed in one of the two cuplike sections, the volume of the liquid being proportioned so that it is but a minor fraction of the volume of the total interior space 14. This liquid may be placed in either of the body sections initially, but for purposes of disclosure it will be assumed that it is placed in the vial section 11 while resting with its open end uppermost, as shown in FIG. 4. The cap section 12 is then placed down over the section 11 in such a manner as to close the open end thereof, the wall of the vial section being between the inner and outer walls of the cap. The cap is then pressed down far enough to bring the first locking ring 15 into engagement with groove 23, as at 18, bringing the parts into the position shown in FIG. 5. This is the storage or shipping position, and in this position the two parts are locked together since engagement of ridge 15 with the edge of groove 23 resists motion which would separate the two sections of the container and thereby open it.

To use the device, discharge tube 28 is first set in the stem of a plant P, as shown in FIG. 1. The tube may be driven into a plant stem, typically the trunk of a tree, by any convenient and suitable means, but it is preferred to set it by means of the tool shown and described in my U.S. Patent No. 2,796,701, issued June 25, 1957, for Tool for Placing Feeding Tubes in Plant Stems. Once the feeder tube has been firmly set in the plant stem with its axis more or less horizontal, the free outer end of the tube is then inserted in the open end of passage 25 and the container is pushed on to the tube. Relative movement of the container and tube brings the tube into contact with wall 26 and continued motion of the container ruptures the wall. Typically the wall breaks away from the container section around most of the perimeter of the passage, leaving a small connection at the bottom of the passage that acts as a hinge and lets the wall fold down and allows the tube to enter into the container, to the position shown in FIG. 2. Here the interior space 14 is now in free communication with the interior of feeder tube 28 through which the liquid contents of the injection device reach the sap stream of the plant.

To energize the device, the opposite ends of the container are grasped and pressed axially together, thus disengaging locking ring 15 from groove 23 and contracting or compressing the container axially to bring the second locking ring 16 into groove 23. The parts are now in the position shown in FIGS. 2 and 6.

This relative movement of the two body sections has reduced the total volume of interior space 14. The result is to compress the air or other gas in space 14 which is above and in contact with liquid body 30. Normally the container parts are so proportioned that the reduction in volume of interior space 14 is sufficient to produce a gas pressure in the neighborhood of five (5) p.s.i. which provides a sufficient gas drive to force the liquid contents out of the container through tube 28. The volume of the body 30 of liquid is preferably less than the amount of the reduction in volume of space 14 by moving the body section together, thus maintaining the gas pressure above atmospheric while liquid is being discharged. The body of gas above the liquid is in direct contact with the liquid and exerts enough pressure thereon to force all the contents into the plant and completely empty the container.

The total volume of the liquid within the container may be very small, that is a dosage in the range of one (1) to seven (7) millilitres is normally adequate. The gas within the pressurized container not only exerts a driving force on the liquid but prevents the formation of a subatmospheric pressure in the container which might otherwise develop and slow up or prevent complete removal of the liquid from the container. It also overcomes any vapor block in feeder tube 28.

As the vial section 11 moves inwardly, it fits sufficiently tightly against inner wall 20 to provide an air tight seal with the wall of cap 12, thus preventing escape of contents and loss of gas pressure. Ridge 15 acts to improve seal with the outer wall of cap section 12 as it is moved inwardly from groove 23. In order to prevent air from being trapped in the lower end of the annular space between the inner and outer walls 20 and 21, which would make it difficult to force section 11 into this space, it has been found preferable to provide two small axial ridges 31 on the outside of ring 15 which form between them a small bleed passage 32 (FIGS. 4 and 8) which allows the escape of air from the bottom of the space between the two walls 20 and 21 as the container sections are telescoped together.

One advantage of the invention is that when the container is empty, it remains essentially sealed and is still tamper-proof against opening. This permits handling without danger to personnel. Accordingly, disposal of the used container is safe and avoids any problem of contact with the toxic materials arising from attempted reuse of the container, as may be done with conventional bottles.

When the container is filled and assembled on automatic machinery, the cap moves rapidly from the position of FIG. 4 to that of FIG. 5. The tight fit between the two sections traps air inside the container; and this air is compressed as the two sections move to the first locking position. The super-atmospheric pressure thus produced may be objectionable at times. It can be reduced or eliminated by purging the interior of cap 12 with live steam immediately prior to capping the vial. The steam displaces some of the air and condenses when cool, thus reducing the final internal pressure. As a consequence, the internal pressure can be established initially at or even below atmospheric by this method. Subatmospheric pressure inside the container assists in keeping the cap in place and adds to the safety of the device, even when stored in a warm place.

From the above it will be obvious without illustration that the spacing between ridges 15 and 16 may be varied to obtain any desired movement of the two sections when telescoped. Likewise, another locking ring, or rings, may be added, making a total of three or more. In this way the decrease in internal volume can be adjusted to compensate for different volumes of the liquid body 30 or to obtain different air drive pressures for discharging the contents.

It will be obvious that various other modifications or changes in the details of the container may be made without departing from the spirit and scope of the invention. Accordingly, the above description is considered to be illustrative of rather than limitative upon the invention defined by the appended claims.

I claim:
1. A hollow container of variable volume comprising: a pair of cup-shaped, interfitting body sections having imperforate side walls that slidably engage each other with a fluid-tight fit, said body sections cooperating to enclose a single undivided interior space of which the volume is varied by relative axial movement of the body sections;

and locking means carried on the body sections comprising interengageable configurations on the body sections, the first body section having two similar configurations at axially spaced positions and the second body section having a single complementary configuration engageable with either of the similar configurations to prevent relative axial motion of the body sections in a direction to separate the body sections but disengageable from one of said similar configurations to engage the other of said similar configurations by relative axial movement of the two body sections in a direction to reduce the volume of said interior space.

2. A hollow container as claimed in claim 1 that also includes sealing means comprising a second annular wall carried by one of the body sections to prevent loss of contents as the sections are moved from said one position in a direction to reduce the volume of said space.

3. A hollow container as claimed in claim 1 in which one section has a discharge passage open at one end to the exterior of the container and closed to communication with the interior space by a removable element at a position spaced inwardly from said one end of the passage.

4. A hollow container as in claim 3 in which the removable element is a thin wall integral with the body section and disposed in a plane inclined to the axis of the passage, said thin wall being rupturable by externally applied force.

5. A container as in claim 1 in which said interengageable configurations include two spaced external annular ridges on one section and an internal annular groove on the other section.

6. A device for injecting a quantity of liquid into a plant, comprising:

a pair of cup-shaped, interfitting body sections having imperforate side walls that slidably engage each other with a fluid-tight fit, said body sections cooperating to enclose a single undivided interior space of which the volume is varied by relative axial movement of the body sections;

locking means carried on the body sections comprising interengageable configurations on the body sections, the first body section having two similar configurations at axially spaced positions and the second body section having a single complementary configuration engageable with either of the similar configurations to prevent relative axial motion of the body sections in a direction to separate the body sections but disengageable from one of said similar configurations to engage the other of said similar configurations by relative axial movement of the two body sections in a direction to reduce the volume of said interior space;

a quantity of liquid in said space having a volume less than said reduced volume of the space, the remainder of the space being filled with a gas in contact with said liquid;

passage means in one container section for discharging the liquid;

and a discharge tube slidably received in the discharge passage with a fluid-tight fit with the sides of the passage.

7. An injecting device as claimed in claim 6 that also includes a relatively thinner area in and integral with the wall of said one container section closing the inner end of the passage means, said wall being rupturable at the inner area by force applied externally thereto through the passage by the discharge tube.

8. A device for injecting a liquid as in claim 6 in which the volumes of the interior space and the liquid therein are in such proportion that the reduction in volume of the space exceeds the volume of the liquid therein whereby the gas pressure is above atmospheric when the liquid is substantially fully discharged.

9. A device as in claim 6 in which one of the body sections has a pair of annularly spaced cylindrical walls and the other body section has a cylindrical wall which fits into the annular space between the two walls and engages both walls with a fluid-tight fit;

and which also includes means forming a bleed passage to allow escape of air from said annular space when the body sections are telescoped together.

10. A device as in claim 9 in which the last-mentioned means is a rib on the exterior surface of the cylindrical wall of said other body section, said rib extending parallel to the direction of relative movement of the body sections when telescoped.

11. A hollow container of variable volume, comprising:

a first imperforate cup-like body section open at one end and having a pair of annularly spaced cylindrical walls;

a second imperforate cup-like body section open at one end and having a cylindrical wall of a diameter to fit into the annular space between and in fluid-tight, sliding engagement with both walls of said pair of walls when the two body sections are interfitted to form a container;

and means on the exterior of the wall of the second body section forming a bleed passage to allow escape of air from said annular space when the body sections are telescoped together.

12. A hollow container as in claim 11 in which the last-mentioned means comprises a pair of spaced ribs extending parallel to the direction of movement of the sections when telescoped.

References Cited by the Examiner
UNITED STATES PATENTS

| | | | |
|---|---|---|---|
| 798,093 | 8/1905 | Dean | 128—216 |
| 2,591,653 | 4/1952 | Altiere et al. | 222—193 |
| 2,860,635 | 11/1958 | Wilburn | 128—218 |
| 2,880,939 | 4/1959 | Esmay | 239—331 |

ABRAHAM G. STONE, *Primary Examiner.*

R. E. BAGWILL, *Assistant Examiner.*